(No Model.)
L. G. COOK.
HYDROPNEUMATIC ENGINE.
No. 271,040. Patented Jan. 23, 1883.
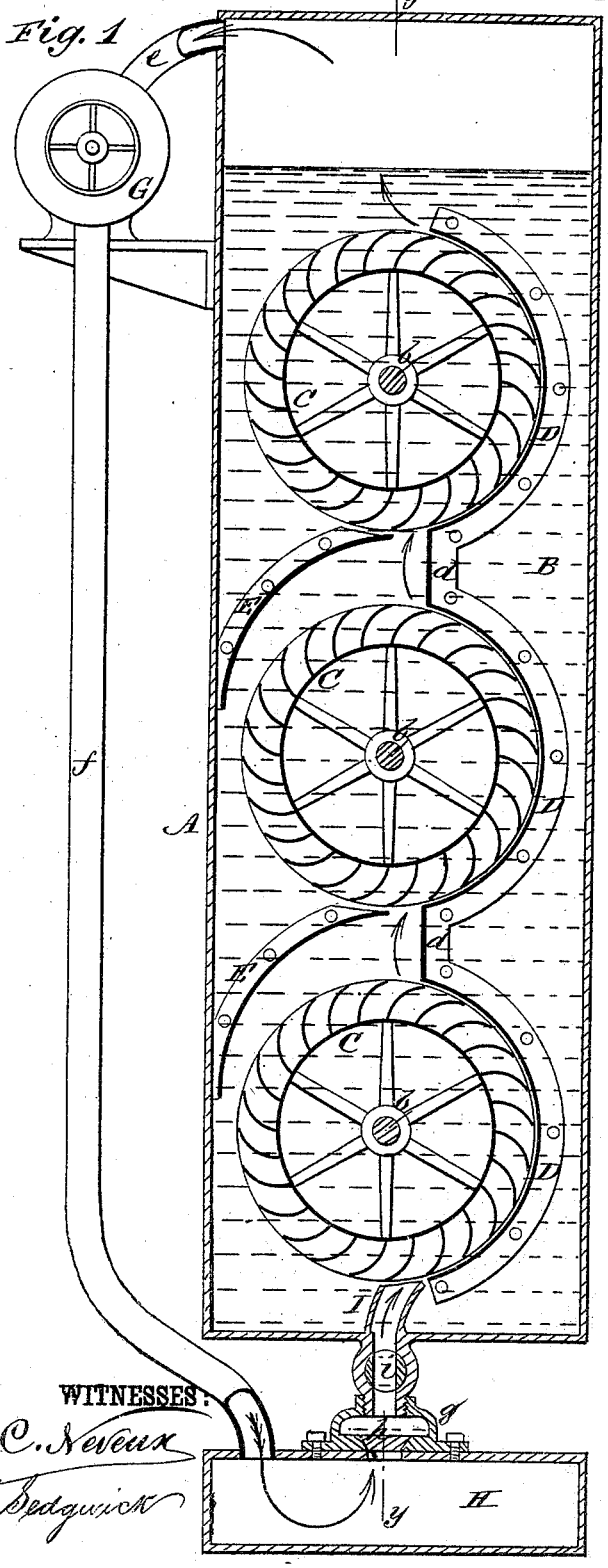
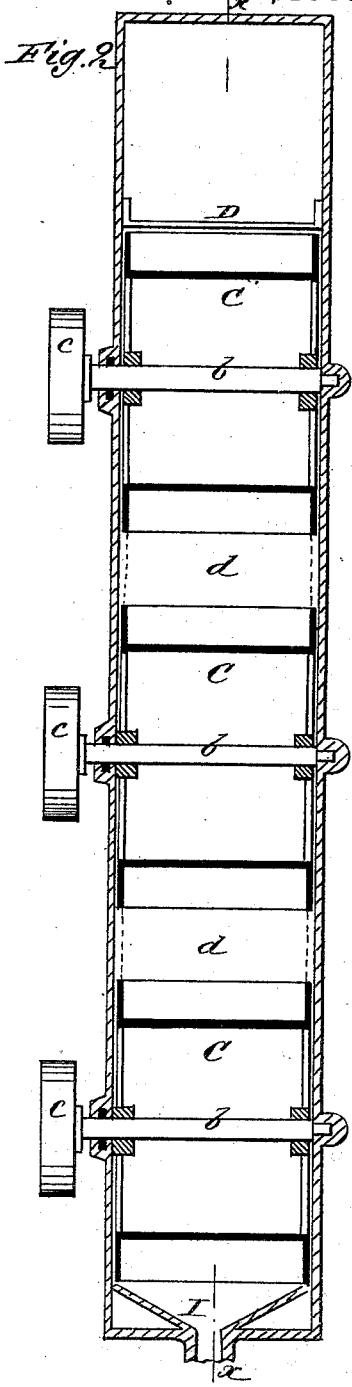
WITNESSES:
C. Neveux
C. Sedgwick
INVENTOR:
L. G. Cook
BY Munn & Co.
ATTORNEYS.

UNITED STATES PATENT OFFICE.

LEVI G. COOK, OF MAPLEVILLE, RHODE ISLAND.

HYDROPNEUMATIC ENGINE.

SPECIFICATION forming part of Letters Patent No. 271,040, dated January 23, 1883.

Application filed April 28, 1882. (No model.)

*To all whom it may concern:*

Be it known that I, LEVI G. COOK, of Mapleville, in the county of Providence and State of Rhode Island, have invented a new and useful Improvement in Hydropneumatic Engines, of which the following is a full, clear, and exact description.

Reference is to be had to the accompanying drawings, forming part of this specification, in which similar letters of reference indicate corresponding parts in both the figures.

Figures 1 and 2 represent vertical sections of an apparatus constructed in accordance with my invention, said sections being taken in planes at right angles to each other, as indicated by the lines $x\,x$ and $y\,y$.

This invention relates to the application of air and water combined for the production of a motive power; and it consists in a novel method of and apparatus for utilizing atmospheric air under pressure and subject to its percolation or passage up through a column of water to the driving or rotation of a series of submerged wheels, from the shafts of which the power obtained may be transferred as required, and in certain combinations of details for working and controlling the apparatus to advantage.

In the drawings, A indicates a covered well or tank of any desired depth, and which it is proposed to nearly fill with water B, and to arrange within it two, three, or any greater number of submerged vertical bucket-wheels, C C, situated one above the other. These wheels, which have preferably their buckets curved and are designed to rotate with the convex surfaces of the buckets foremost, are fast on horizontal shafts $b$, arranged to project through stuffing-boxes in one side of the well, for the purpose of communicating power from the wheels by means of pulleys $c\,c$ or otherwise. The rising side of each of these wheels C works in close proximity with a curb or guard, D, each one of which is connected with the other at $d$, and attached to the side of the well. Next to the falling sides of the wheels are additional but farther-removed guards, E, arranged to extend from the bottom of one wheel to and over the whole or greater part of the upper falling portion of the wheel next beneath it. The uses of these several guards will be hereinafter explained.

G is a blower; or any air-forcing pump or engine may be used in its place. This blower is connected above with the upper air-space in the well above the water B by a pipe, $e$, and is further connected below by a pipe, $f$, with a compressed-air box or chamber, H, into which the blower delivers or compresses the air. Said air box or chamber H, which may be arranged below the well A, is mounted with a valve-box, $g$, in which is a check-valve, $h$, opening against the superincumbent weight or pressure of the water in the well, such valve-box connecting, on the back side of the valve $h$, with the lower portion of the interior of the well by a pipe or tubular conductor, I, fitted with a stop-cock or valve, $i$, and bent at its upper end to conduct or deliver the air from the box H against the lower buckets of the undermost wheel C, to rotate it as described.

In the operation of the apparatus air is forced by the blower G into the air-box H, and from thence passes, against the pressure of the water in the well, through the opening covered by the valve $h$, and, percolating through the water in the conductor I, acts either directly or indirectly, through the water, upon the buckets of the lowermost wheel C to rotate it, the curb D of such wheel preventing the ineffective diffusion of said air away from the rising portion of the wheel, and, after having acted upon the bottom wheel C, it passes to act in a similar manner upon the next wheel C, the lowermost shield or guard E operating, conjointly with the connection $d$ between the adjacent curbs D D, to direct it to the second wheel, and so on for any number of wheels C in succession. In this action of the air on the wheels its inferior specific gravity and natural tendency to work upward through the water must be taken into account, and the parts of the apparatus be arranged accordingly, to produce the most useful effect. The height or weight of the water in the well is also a factor in the effect produced, and each wheel C may constitute a separate driver of machinery, which will be found very useful in communicating power to different stories of a mill or other building, the well in such application of the apparatus being a tank or receptacle running the height of the different stories, and having the water pumped up into it. In all cases the water in the well is still water. None is consumed, except by leakage, in developing the power of the apparatus, and the same air, after it has repeated its action upon the different wheels and escaped into the covered space above the water in the well, may be drawn in by the blower and used over again.

The check-valve $h$ prevents the flow of water from the valve into the air-box H when the apparatus is at rest, and the cock $i$ may serve to adjust the discharge of air from the air-box or to shut off escape of water from the well whenever it may become necessary to detach the air-box H or valve-box $g$, mounted thereon.

Of course other liquids might take the place of water in the well.

Having thus fully described my invention, what I claim as new, and desire to secure by Letters Patent, is—

1. The combination of the compressed-air box or chamber H, the valve-box $g$, with its check-valve $h$, the air pipe or conductor I, provided with a cock or valve, $i$, the still-water well A and its series of submerged bucket-wheels C C, with their guards D and E, substantially as specified.

2. The combination of an air compressor or blower, G, with the covered still-water well A, a suction pipe or duct connecting said blower with the air-space above the water in the well, the air box or chamber H, into which the air is forced by the blower, the conductor I in communication with said box, and a series of submerged bucket-wheels, C C, with the guards D E, essentially as and for the purposes herein set forth.

LEVI G. COOK.

Witnesses:
 EDMUND H. SMITH,
 JOHN A. BAILEY.